United States Patent [19]

Vogl et al.

[11] Patent Number: 4,458,147
[45] Date of Patent: Jul. 3, 1984

[54] APPARATUS FOR EVALUATING OPTICAL SIGNALS

[75] Inventors: Georg Vogl, Saltsjöbaden; Bo Möller, Bromma; Erland Pettersson; Arnold Johansson, both of Karlskoga, all of Sweden

[73] Assignee: Aktiebolaget Bofors, Bofors, Sweden

[21] Appl. No.: 316,719

[22] Filed: Oct. 30, 1981

[30] Foreign Application Priority Data

Oct. 31, 1980 [SE] Sweden ............... 8007671

[51] Int. Cl.³ .............................. G01D 5/36
[52] U.S. Cl. .................... 250/233; 350/274
[58] Field of Search ............ 250/233, 345, 346, 347, 250/203 R; 350/274, 173

[56] References Cited

U.S. PATENT DOCUMENTS 3,366,795  1/1968  Ravitsky et al. ............ 250/233
3,677,652  7/1972  Little ..................... 250/233 X
3,968,476  7/1976  McMahon .................. 250/233 X Primary Examiner—David C. Nelms
Assistant Examiner—Edward P. Westin
Attorney, Agent, or Firm—Pollock, Vande Sande & Priddy

[57] ABSTRACT

This invention relates to a device for use when evaluating optical signals by means of a chopper (2, 2′), i.e. a rotating shutter, and a photodetector (6, 6′) for detecting the signal transmitted through the chopper (2, 2′). In order to improve the evaluation of the incident signal the opaque part (3, 3′) of the chopper is provided with a reflective surface (7) to utilize also the optical signal falling on the opaque part (3, 3′). An additional photodetector (9, 9′) has been arranged for detecting this reflected optical signal. In order to reduce the energy losses and in this way increase the amplification of the optical signal the device also comprises an optical element in the form of a glass prism (10, 10′) in which one and the same surface is utilized both for transmitting and reflecting the optical signal.

5 Claims, 2 Drawing Figures

APPARATUS FOR EVALUATING OPTICAL SIGNALS

TECHNICAL FIELD

The present invention relates to a device for use when evaluating optical signals by means of a chopper.

BACKGROUND ART

Choppers in the form of rotary shutters have been used for locating the position of optical signals, such as the radiation emitted by an object, for the purpose of determining the coordinates representing the direction towards such an object. The radiation emitted by the object is projected as an image point on the chopper plane. The chopper comprises one or more clearly defined opaque portions which prevent the incident radiation from passing through the chopper. This means that when the chopper is rotating a plurality of pulses are produced by a photodetector which is positioned behind the chopper. The pulse signal emitted by the photodetector is evaluated with respect to the radial distance of the image point from the center of the chopper and also with respect to its angular position, which makes it possible to determine the direction towards the radiation source. One example of such a measuring device is described in Swedish patent application No. 76 13514-4, which corresponds to U.S. Pat. No. 4,178,505. The signals emitted by a remote object are often very small which means that a high degree of amplification of the signals is required. Due to the background noise such a high degree of amplification often makes the signal indecipherable to the signal processing means of the measuring device. There is a substantial risk that one or more signal pulses will be contaminated with the background noise with the result of an erroneous evaluation.

Disclosure of the Invention

It is therefore an object of the present invention to improve the evaluation of the incident optical signal. The invention is mainly characterized in that the opaque shutter is provided with a reflective surface for reflecting the incident optical signal onto an additional photo detector for detecting the reflected optical signal.

This means that the entire incident optical signal is used and detectd, including that part of the incident radiation which strikes the opaque portion of the chopper. Instead of detecting only that part of the signal which passes through the transparent portions of the chopper, both the reflected and transmitted parts of the incident radiation are detected which means a more reliable evaluation of the signal.

It is another object of this invention to minimize the energy losses. For that reason the device comprises an optical element in the form of a glass prism in which one and the same surface is used for transmitting as well as reflecting the optical signal.

Brief Description of the Drawing

The invention will in the following be described in more detail with reference to the accompanying drawings in which FIG. 1 schematically illustrates a preferred embodiment of the invention.

Best Mode for Carrying Out the Invention

Figure 1:
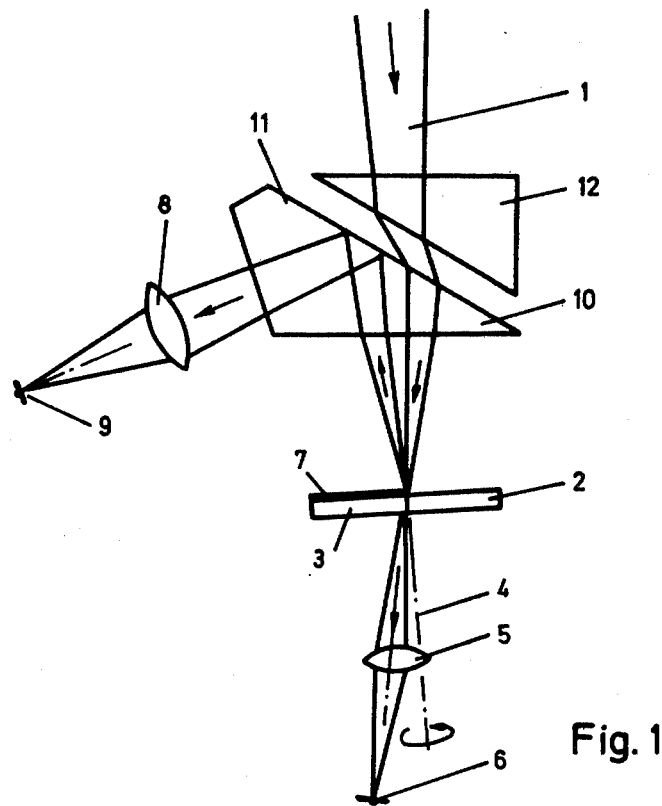

The device illustrated in FIG. 1 is arranged to pick up a beam 1 of radiation emitted by an object, for instance a guided object or a target to be tracked. The emitted radiation may be generated by a source disposed in the object or by a source located at the measuring device from which radiation is reflected back to the measuring device by means of reflecting means disposed in the object. The beam 1 of emitted radiation is projected to an image point on a chopper 2. The chopper 2 comprises two parts, a transparent part, for instance an opening, and an opaque but reflective part. When the chopper is rotating about an axis 4 the projected image point describes a circle with respect to the chopper with the center of the circle located at the rotating center of the chopper. Depending on the angular position of the chopper, the incident radiation beams strike the opaque part 3 of the chopper or are transmitted through the transparent portion of the chopper. During that part of the revolution when the image point is passing the transparent part of the chopper, an output signal is emitted by the photo detector 6 in the form of one pulse if the radiation source is transmitting a steady state radiation or a pulse train for a pulse modulated radiation source. The output signal from the photo detector 6 then consists of a pulse or a pulse train repeated each revolution made by the chopper and this output signal is fed to electronic signal processing means for evaluation. Such signal processing means are known per se and will not be described in detail.

As already mentioned the incident optical signal is often very weak and a background noise makes it more or less impossible to discriminate the true signal from the background noise. There is a substantial risk that one or more signal pulses are contaminated with the background noise which means an incorrectly evaluated signal.

In order to improve the evaluation of the incident optical signal the opaque part 3 of the chopper has a reflective surface 7 to take advantage also of that part of the incident optical signal which strikes the opaque part 3. This part of the radiation is then reflected by the reflective surface and projected by means of a lens 8 onto a second photodetector 9. This means that when for instance a pulse white-black is emitted by the first photodetector 6, then a pulse black-white is emitted by the second photodetector 9. Also the output signal emitted by the second photodetector 9 is transmitted to the signal processing means and by comparing the two signals a more reliable evaluation can be effectuated when the incident signal is very weak and difficult to discriminate from the background noice.

In order to prevent the reflected radiation beams from returning in the same direction as the incident beams, the chopper, or at least the reflective surface 7 of the shutter opaque part 3, should be inclined.

In order to minimize the energy losses an optical element in the form of a glass prism 10 is used which functions as a refracting prism for the incident beams and a reflecting prism for the beams which have been reflected by reflective surface 7. The one and same surface 11 of the prism 10 is used for transmission as well as reflection of the radiation. In order to compensate for optical image errors and especially for turning the image plane to coincide with the chopper, a compensating prism 12 is disposed above the prism 10. It is not necessary that the angles or the type of glass of the compensating prism 12 are the same as those of the prism 10. The compensating prism 12 may for instance be made of a normal conventional sodium glass; and the prism 10, of a very high refracting glass, or vice versa. The reason for such differences is a desire to locate the image plane in the chopper plane.

Figure 2:
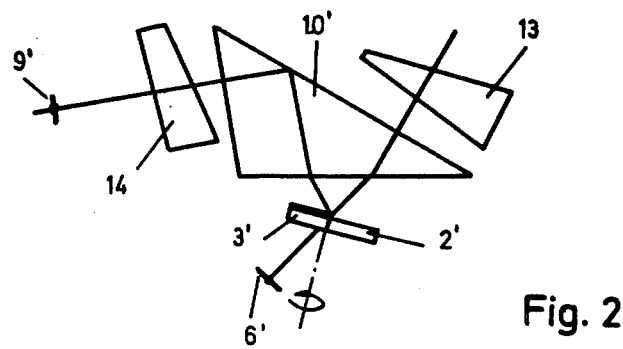
FIG. 2, an alternative embodiment.

In FIG. 2 an alternative embodiment of the invention is illustrated which embodiment in conformity with the above-mentioned device comprises a chopper 2' having a rotating opaque part 3' and two photo detectors 6' and 9' for transmitted and reflected radiation, respectively. In this case the device is formed with a right-angled radiation path through the prism 10' by means of appropriate compensating prisms 13, 14. In order to locate the image plane in the chopper plane the compensating prisms can be so orientated that they form an angle relative to the optical axis. If necessary cylindrical surfaces can be used to improve the sharpness of the image.

The invention is not limited to the embodiment which has been described but can be varied within the scope of the accompanying claims.

We claim:

1. An apparatus for evaluating optical signals, comprising:
    a rotatable chopper having a transparent part through which a first portion of said signals can pass and an opaque reflective part from which a second portion of said signals is reflected;
    prism means for transmitting said signals to said chopper and for reflecting said second portion of said signals following reflection thereof by said opaque reflective part of said chopper, said prism means including a first prism having a single surface which both transmits said signals to said chopper and reflects said second portion of said signals; and
    means for detecting said first and second portion of said signals.

2. An apparatus according to claim 1, wherein said means for detecting comprises a first photodetector for said first portion and a second photodetector for said second portion.

3. An apparatus according to claim 1, wherein said prism means comprises a second prism for transmitting said signals to said first prism and for compensating for image errors.

4. An apparatus according to claim 3, wherein said first prism is made of a high refracting glass and said second prism is made from a normal glass.

5. An apparatus according to claim 3, wherein said first prism is made from a normal glass and said second prism is made from a high refracting glass.

* * * * *